United States Patent [19]

Shattuck

[11] Patent Number: 4,616,713
[45] Date of Patent: Oct. 14, 1986

[54] BLADE ADJUSTMENT DEVICE FOR SOD CUTTING MACHINE

[76] Inventor: Thomas G. Shattuck, P.O. Box 818, R.R. 2, Waukee, Iowa 50263

[21] Appl. No.: 676,491

[22] Filed: Nov. 29, 1984

[51] Int. Cl.⁴ .................. A01B 45/04; G05G 1/04
[52] U.S. Cl. .................................. 172/19; 172/40; 74/519
[58] Field of Search ............ 172/19, 20, 21, 22, 172/40, 87, 89; 74/89.15, 519

[56] References Cited

U.S. PATENT DOCUMENTS

| | | | |
|---|---|---|---|
| 2,614,477 | 10/1952 | Habenicht | 172/20 |
| 2,617,347 | 11/1952 | Provost | 172/20 |
| 3,509,944 | 5/1970 | Brouwer et al. | 172/20 X |
| 4,029,152 | 6/1977 | Gerrits | 172/19 |
| 4,317,383 | 3/1982 | Kurosaki et al. | 74/519 X |
| 4,381,166 | 4/1983 | Smart | 74/89.15 X |
| 4,422,392 | 12/1983 | Dreyer et al. | 111/52 |
| 4,466,769 | 8/1984 | Inaba et al. | 74/89.15 X |
| 4,506,740 | 3/1985 | Carter | 172/40 |
| 4,553,606 | 11/1985 | Arnold | 172/19 |

Primary Examiner—Richard T. Stouffer
Assistant Examiner—Terrence L. B. Brown
Attorney, Agent, or Firm—Zarley, McKee, Thomte, Voorhees & Sease

[57] ABSTRACT

The blade adjustment device of the present invention is used with a sod cutting machine comprising a sod cutting blade, a sod roller positioned in close spaced relation to the blade for cooperating with the blade to sever the sod from the ground, a blade supporting frame connected to the blade and movably mounted for movement toward and away from the roller. The adjustment device comprises a power actuator, and a linkage mechanism pivotally interconnecting the power actuator to the blade supporting frame for causing the blade supporting frame to move toward and away from the roller. The linkage includes an input end connected to the power means and an output end connected to the blade supporting frame for moving the blade supporting frame in response to actuation of the power actuator. The linkage mechanism reduces the distance of movement, so that the input end moves a greater distance than the output end.

5 Claims, 9 Drawing Figures

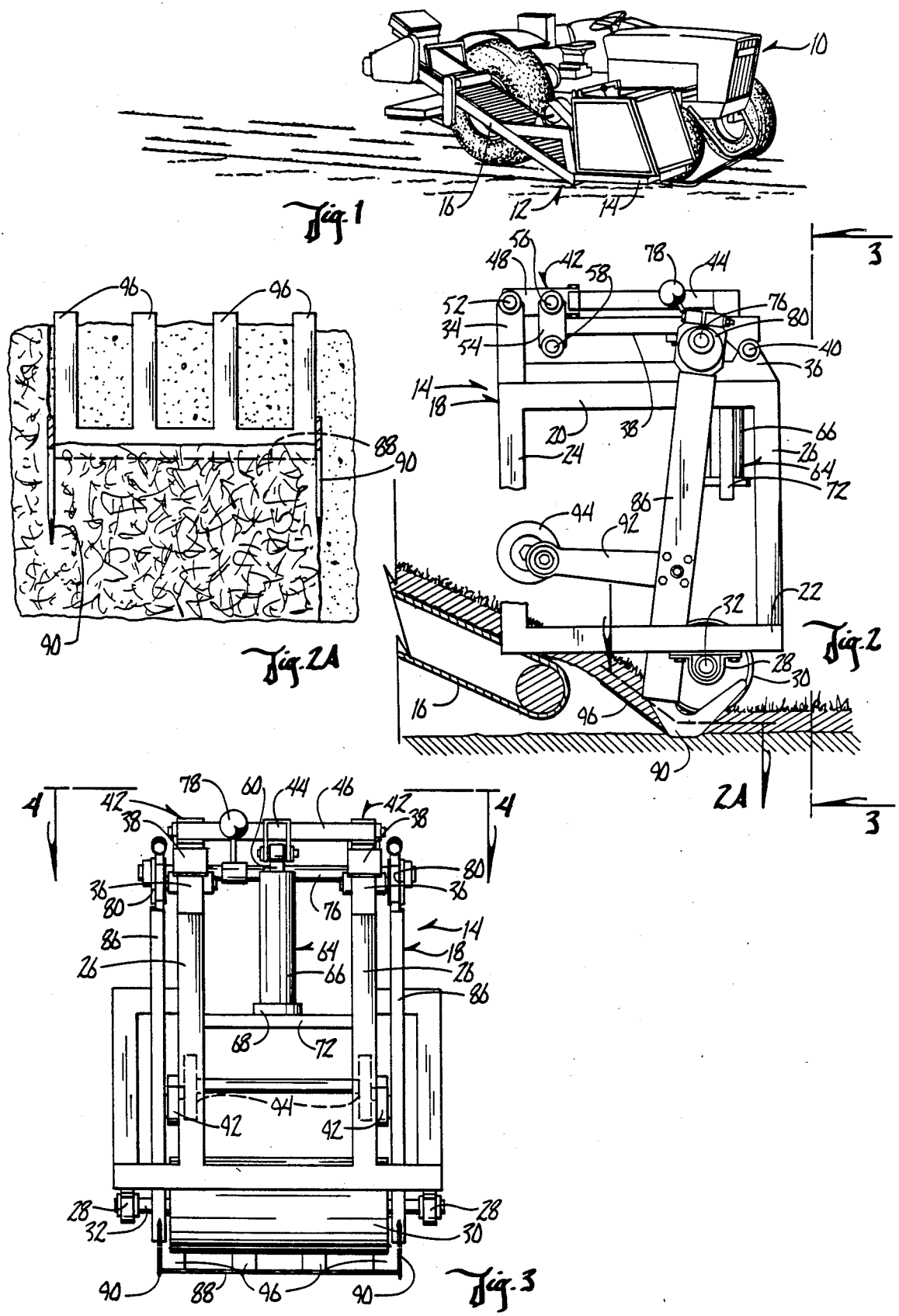

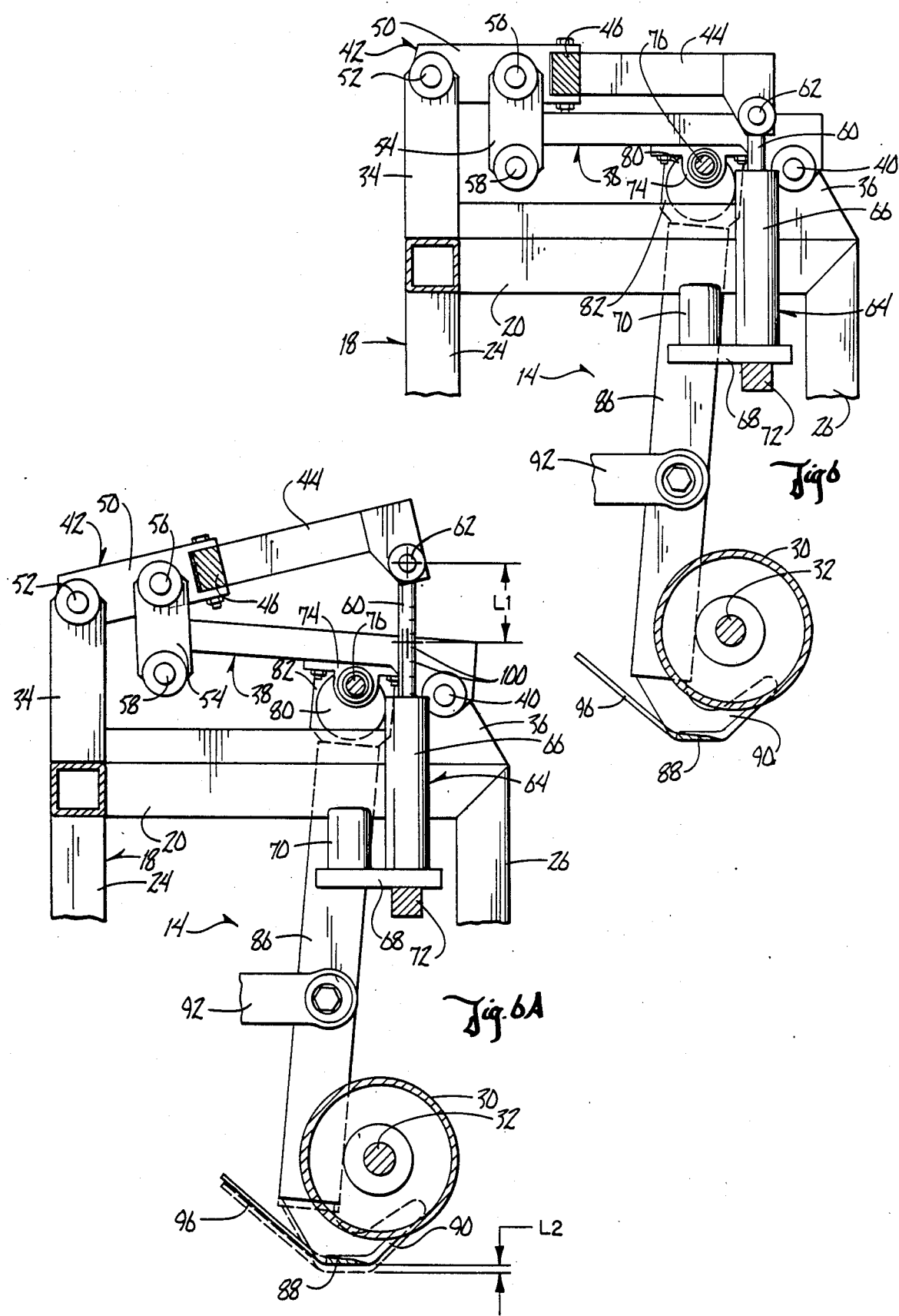

BLADE ADJUSTMENT DEVICE FOR SOD CUTTING MACHINE

BACKGROUND OF THE INVENTION

This invention relates to a blade adjustment device for a sod cutting machine.

Recent sod cutting machines utilize a sod roller which rolls on top of the layer of sod to be removed from the soil. A cutting blade is spaced in close proximity to the sod roller, but below the sod roller so that the cutting blade can sever the sod from the ground. The sod passes between the cutting blade and the sod roller as it is being severed from the ground.

During the sod cutting operation, it is sometimes desirable to adjust the distance between the cutting blade and the sod roller. For example, when sandy soils are encountered, it is desirable to widen the distance between the blade and the roller, whereas with heavier soils, the distance can be reduced.

In prior devices, the changing of the distance between the cutting blade and the roller was a manual adjustment requiring the operator to dismount from the vehicle carrying the sod cutting machine. In order to make such an adjustment, the operator would first have to loosen certain clamps holding the blade in position, readjust the distance of the blade, and then retighten the clamps so as to hold the blade against movement. This was a time consuming task, and often required several adjustments by trial and error.

Furthermore, the prior devices for adjusting the blade with respect to the roller did not permit continuous adjustment as the sod cutting machine progressed through the sod.

Therefore, a primary object of the present invention is the provision of an improved blade adjustment device for a sod cutting machine.

A further object of the present invention is the provision of a blade adjustment device which improves the precision with which the distance between the blade and the roller can be set.

A further object of the present invention is the provision of an improved blade adjustment device which permits the operator to change the distance of the blade from the roller while the operator is riding on the vehicle carrying the sod cutting machine.

A further object of the present invention is the provision of a blade adjustment device which permits the operator to adjust the distance between the roller and the blade continuously throughout the sod cutting operation.

A further object of the present invention is the provision of an improved sod cutting device which includes a power means having a stroke considerably longer than the distance between the blade and the roller.

A further object of the present invention is the provision of an improved blade adjustment device wherein a linkage interconnects the power means and the blade for causing the blade to move a short distance in response to a considerably longer stroke of the power means.

A further object of the present invention is the provision of a device which provides strong positive control of the position of the blade and holds the blade against movement with respect to the roller once the position of the blade has been set.

A further object of the present invention is the provision of a device which is economical to manufacture, durable in use and efficient in operation.

SUMMARY OF THE INVENTION

The present invention utilizes a power actuator and a linkage to move the blade with respect to the roller. Present machines include a blade mounted to a blade holding frame. The blade holding frame includes at its upper end a cam which may be manually rotated to cause the blade frame to move upwardly or downwardly with respect to the sod roller.

The present invention utilizes an electrically powered actuator which is connected to the input end of a linkage. The linkage includes an output end which is connected to the blade frame. The linkage is so arranged that the input end of the linkage moves a greater distance than the output end so that more precise positioning of the blade can be attained.

The linkage includes a first link which is pivotally connected at one of its ends to the sod cutter frame for pivotal movement about a stationary axis. The opposite end of the first link is connected to a longitudinally extensible power means, such as a hydraulic cylinder or an electronically powered actuator. A second link includes one end pivotally connected to the sod cutter frame for pivotal movement about a second stationary axis. The other end of the second link is pivotally connected to the first link for articulated movement about a link axis.

The blade frame is pivotally connected to the second link at a point located between its opposite ends. Thus, when the actuator is extended, the first link pivots about its stationary axis, thereby causing pivotal movement of the second link about its stationary axis. The pivotal movement of the second link causes the blade frame to be raised, and the distance that the blade frame is raised is substantially less than the initial stroke of the power actuator.

The extension of the power actuator therefore causes movement of the blade with respect to the blade roller, but the distance that the blade moves is considerably less than the stroke of the power actuator. This permits the power actuator to be calibrated so that the operator riding on the vehicle can easily and precisely determine the position of the blade with respect to the roller.

The actuator may be a hydraulic cylinder, a pneumatic cylinder, or other forms of longitudinally extendable devices. However, a preferred device for use as an actuator is an electronically actuated device manufactured by Warner Electric Company, South Detroit, Ill. 61080 under the Model Number D1120A5-06. The device has an electrical motor which operates on 12 volts direct current. The motor drives a gear assembly which engages a longitudinally extendable rod having a six inch stroke. The device is capable of providing 250 pounds of force and is capable of moving the rod 0.6 inches per second. The gear drive between the motor and the rod permits the rod to be stopped and locked in any position along the length of its stroke.

Because the device is driven by an electrical motor, wires may lead from the electrical motor to a control switch adjacent the instrument panel on the tractor which the operator is driving. This permits the operator to control the position of the actuator while the operator is driving the vehicle.

BRIEF DESCRIPTION OF THE FIGURES OF THE DRAWINGS

FIG. 1 is a perspective view of a sod cutting machine utilizing the present invention.

FIG. 2 is a side elevational view of the sod cutter, with the outer safety housing removed.

FIG. 2A is a sectional view taken along line 2A—2A of FIG. 2.

FIG. 3 is a front elevational view taken along line 3—3 of FIG. 2.

FIG. 6 is a sectional view taken along line 6—6 of FIG. 4.

FIG. 6A is a view similar to FIG. 6, but showing the actuator in an extended position.

DETAILED DESCRIPTION OF THE PREFERRED EMBODIMENT

Figure 4:
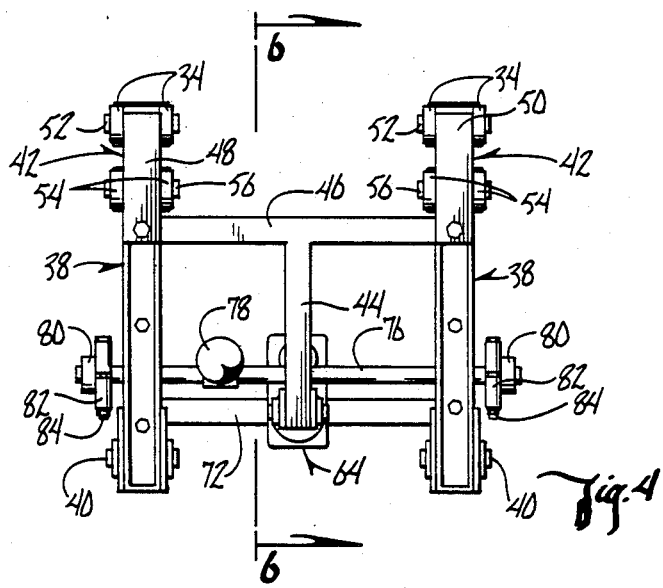
FIG. 4 is a top plan view taken along line 4—4 of FIG. 3.

Referring to the drawings, the numeral 10 generally designates a tractor having a sod cutting machine 12 mounted thereon. Machine 12 includes a cutting assembly 14, and a conveying and rolling assembly 16. The blade adjustment device of the present invention is adapted for use on the cutting assembly 14, and therefore the conveying assembly and the tractor 10 are not described in detail.

Cutting assembly 14 includes a sod cutter frame 18 having an upper horizontal member 20, a lower horizontal member 22 and two spaced apart vertical members 24, 26.

A pair of bearings 28 are attached to lower horizontal member 22, and rotatably support a sod roller 30 for rotation about an axis 32 which is fixed with respect to sod cutter frame 18.

Rigidly connected to upper member 20 are a pair of spaced apart hinge flanges 34, 36. A lower link 38 is pivotally connected at one end to hinge flange 36 for pivotal movement about a stationary axis 40. An upper link 42 is Y-shaped (FIG. 5), and includes a tongue member 44, a cross bar 46 and two spaced apart legs or upper links 48, 50. The ends of legs 48, 50 are pivotally connected to hinge flanges 34 for pivotal movement about a stationary axis 52.

Upper link 48 and lower link 38 are interconnected by means of a suspension link 54 having its upper end pivoted to upper link 48 for pivotal movement about axis 56 and having its lower end pivotally connected to lower link 38 for pivotal movement about axis 58.

Tongue 44 of upper link 42 is pivotally connected to an actuator rod 60 for pivotal movement about an axis 62. Rod 60 is part of an actuator assembly 64 comprising a cylinder 66, a gear box 68, and a motor 70. Actuator 64 is an electronically actuated device having a six inch stroke, and capable of providing 250 pound no-load force to the rod 60 for causing the rod to extend at 0.6 inches per second. Motor 70 operates at 12 volts direct current. The device is manufactured by Warner Electric, South Detroit, Ill. 61080 under Model Number D1120A5-06. The gear box 68 includes a gear assembly which provides positive control of the position of rod 60. Deactuation of motor 70 causes rod 60 to cease movement, and also locks rod 60 against movement under load.

Actuator assembly 64 is mounted on a U-shaped cross bar 72 which is rigidly connected to upper horizontal member 20 of sod cutter frame 18.

Figure 5:
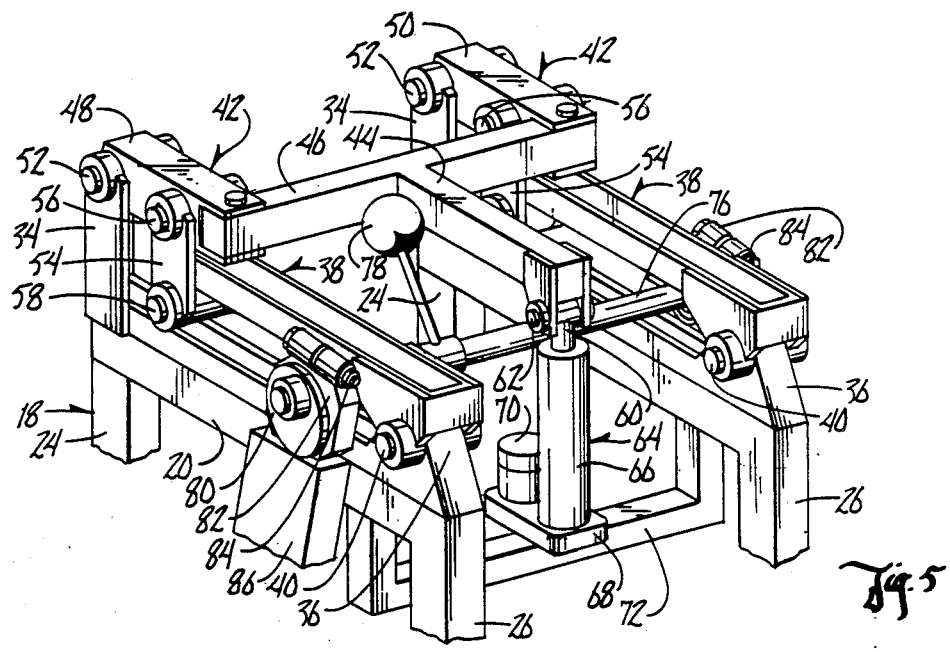
FIG. 5 is a partial perspective view of the linkage mechanism of the present invention.

Connected to lower link 38 is a pillow block 74 (FIG. 6) which supports a cross rod 76. Rigidly connected to cross rod 76 is a lever handle 78. As shown in FIG. 5, one end of rod 76 has an eccentric bearing 80 mounted thereto. Bearing 80 is surrounded by a locking clamp 82 which may be tightened by means of screw 84 so as to prevent rotation of eccentric bearing 80 with respect to clamp 82. Clamp 82 is also connected to the upper end of a blade supporting frame 86 which extends downwardly and is connected at its lower end to a sod cutting blade 88 having side cutters 90 at the opposite ends thereof. Blade supporting frame 86 is also connected to an eccentric arm 92 which is connected to an eccentric wheel 94 driven by the power take off from tractor 10. Rotation of eccentric wheel 94 causes forward and backward reciprocating movement of eccentric arm 92, and also consequently causes forward and backward reciprocating movement of blade holding frame 86 and blade 88. Extending rearwardly from blade 88 are a plurality of inclined support fingers 96.

Handle 78, shaft or rod 76, eccentric bearing 80 and clamp 84 comprise the prior manually operated apparatus for raising and lowering blade 88 with respect to roller 30. In order to adjust the height of blade 88, it was necessary to loosen bolt 84, and to manually rotate shaft 76 by means of lever handle 78. This rotation of shaft 76 caused rotation of eccentric bearing 80, thereby causing the raising or lowering of blade 88 with respect to roller 30. After the desired position was achieved, bolt 84 was tightened again so as to hold the blade against movement.

The foregoing prior art method of adjusting the position of blade 88 required that the operator dismount from vehicle 10 to make the adjustment. Furthermore, there was no way that the blade could be adjusted during the cutting operation and there was no way for continuous adjustment as different types of soil were encountered.

Figure 7:
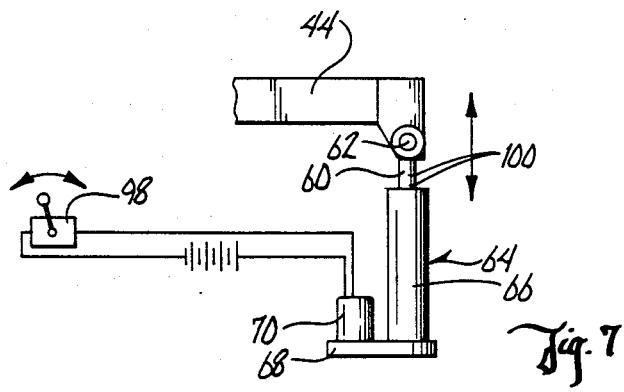
FIG. 7 is a schematic view of the controls for the actuator of the present invention.

The present invention provides an improved apparatus for raising and lowering the blade with respect to roller 30. Motor 70 is electrically connected to a control switch 98 (FIG. 7), which may be mounted at the driver station on vehicle 10. Turning switch 98 on actuates motor 70 which causes extensible movement of rod 60 with respect to cylinder 66. As can be seen in FIGS. 6 and 6A, the extension of rod 60 causes the articulated movement of links 38, 42 with respect to one another. Stationary axes 40, 52 are located at the outside of the linkage. Link axes 56, 58 are located closely adjacent stationary axis 52, and the blade support axis provided by shaft 62 is located intermediate the opposite ends of lower link 38. The result of this arrangement is that the stroke L1 of rod 60 (FIG. 6A) is considerably greater than the displacement L2 in the blade 88. This relationship provides the advantage of permitting precise positioning of blade 88 with respect to roller 30. The operator can more easily stop the movement of blade 88 at the desired position due to the fact that the stroke L1 of rod 60 is considerably longer than the displacement L2 of blade 88. Rod 60 may include a plurality of calibrations 100 thereon which will enable the operator to determine the particular position of blade 88.

Another advantage of the manner in which upper link 42 and lower link 38 are connected to blade frame 86 is the mechanical advantage which is obtained between rod 60 and blade frame 86. This enables the actuator to move the blade against a substantial resisting force, and to hold the blade positively against movement once the desired position of the blade has been achieved. This mechanical advantage enables the actuator to move the blade in the middle of the cutting process when considerable forces are applied to the cutting blade. The device is simple in construction, efficient in operation and durable in use.

Thus, it can be seen that the device accomplishes at least all of its stated objectives.

What is claimed is:

1. A sod cutting machine comprising:

a machine frame;

a sod roller rotatably mounted to said machine frame for rotation about a horizontal sod roller axis;

a blade supporting frame having a sod cutting blade attached thereto;

a linkage mechanism pivotally interconnecting said machine frame and said blade supporting frame for permitting selective movement of said blade toward and away from said sod roller between first and second blade positions relative to said sod roller, said blade being closer to said roller when in said second blade position than when in said first blade position;

said linkage mechanism comprising first, second and third links, each of which have first and second ends, said first ends of said first and second links being pivotally connected to said machine frame about first and second horizontal link axes, respectively;

said first link being pivotally connected to said first and second links about third and fourth link axes, respectively;

said blade supporting frame being pivotally connected to said second link about a fifth link axis;

a power means pivotally connected to said first link at an input point for moving said first link between first and second input positions; said second and third links, said blade supporting frame, and said blade being movable in response to movement of said first link between said first and second input positions for causing said blade to move between said first and second blade positions.

2. A sod cutting machine according to claim 1 wherein the locations of said first, second, third and fourth link axes are chosen so as to cause said input point to move an input distance in response to actuation of said power means and to cause said blade to move an output distance substantially less than said input distance in response to actuation of said power means.

3. A sod cutting machine according to claim 2 wherein said third link axis is located between said first link axis and said input point, said pivotal connection of said blade supporting frame to said second link about said fifth link axis being located between said second and fourth link axes, respectively.

4. A sod cutting machine according to claim 1 wherein said power means comprises a first power member and a second power member which are longitudinally extensible with respect to one another, said first power member being connected to said first link at said input point, said second power member being connected to said machine frame.

5. A sod cutting machine according to claim 4 wherein said power means further comprises an electric motor drivingly connected to said first and second power members for causing longitudinal extensible movement of said first and second power members with respect to one another.

* * * * *